US008614411B2

(12) United States Patent
Chen et al.

(10) Patent No.: US 8,614,411 B2
(45) Date of Patent: Dec. 24, 2013

(54) 2D/3D DUAL-MODE IMAGE SENSING CIRCUITRY WITH A PULL-DOWN UNIT

(75) Inventors: Oscal Tzyh-Chiang Chen, Chia-Yi County (TW); Ming-Chih Lin, Tainan (TW); Chieh-Ning Chan, Tainan County (TW); Zhe-Ming Liu, Changhua County (TW)

(73) Assignee: National Chung Cheng University, Chia-Yi (TW)

( * ) Notice: Subject to any disclaimer, the term of this patent is extended or adjusted under 35 U.S.C. 154(b) by 448 days.

(21) Appl. No.: 12/982,632

(22) Filed: Dec. 30, 2010

(65) Prior Publication Data

US 2012/0068053 A1 Mar. 22, 2012

(30) Foreign Application Priority Data

Sep. 20, 2010 (TW) ................................ 99131860 A

(51) Int. Cl.
*H01L 31/00* (2006.01)
(52) U.S. Cl.
USPC .................... 250/214.1; 250/208.1; 348/42
(58) Field of Classification Search
USPC ................ 250/208.1, 214.1, 214 R; 257/431; 348/42, 46, 51, 53, 54; 353/6, 7
See application file for complete search history.

(56) References Cited

U.S. PATENT DOCUMENTS

| 5,675,407 A | 10/1997 | Geng |
| 6,384,663 B2 | 5/2002 | Cova et al. |
| 7,262,402 B2 | 8/2007 | Niclass et al. |
| 7,547,872 B2 | 6/2009 | Niclass et al. |
| 2007/0222881 A1* | 9/2007 | Mentzer ........................ 348/308 |

* cited by examiner

*Primary Examiner* — Francis M Legasse, Jr.
(74) *Attorney, Agent, or Firm* — Muncy, Geissler, Olds & Lowe, PLLC

(57) ABSTRACT

A 2D/3D dual-mode image sensing circuitry is composed of a photodiode, an active sensing unit, and a pull-down unit. The photodiode is to detect and convert optical signals into electronic signals. The active sensing unit is electrically connected with one end of the photodiode for receiving electronic signals outputted by the photodiode, having an output. The pull-down unit is electrically connected with the output, providing a pull-down path. The pull-down unit has a pull-down control terminal, by which the pull-down unit can be externally controllably switched on/off, for sinking the potential or not to the aforesaid end of the photodiode. In this way, as the 2D mode is switched on, the 3D mode is switched off; on the other hand, as the 3D mode is switched on, the 2D mode is switched off.

11 Claims, 8 Drawing Sheets

2D/3D DUAL-MODE IMAGE SENSING CIRCUITRY WITH A PULL-DOWN UNIT

BACKGROUND OF THE INVENTION

1. Field of the Invention

The present invention relates generally to a pixel sensor having an Avalanche photodiode, and more particularly, to a 2D/3D dual-mode image sensing circuitry.

2. Description of the Related Art

Among the existing three-dimension (3D) digital cameras, one is composed of two complementary metal oxide semiconductor (CMOS) sensors that can take photographs of one identical frame from two different angles at the same time, while it is intended to take a 3D photograph, and then synthesize a 3D stereoscopic image via an image processor built in the digital camera. How the human eyes can see the stereoscopic image of an object is based on that the light reflected by the object enters the retinas of two eyes, then the existence and shape of the object are perceived, and finally the stereoscopic perception of the object is generated due to the binocular parallax. Thus, the stereoscopic image taken by the camera can be displayed straight on the screen of the camera and the rays distributively enter two eyes in such a way that the binocular parallax results in the stereoscopic perception. The typical camera based on such technique is FUJI FinePix REAL 3D W1. However, such binocular parallax is defective because the viewpoint is fixed for the captured images. Once the viewpoint is changed, the stereopsis disappears.

Another 3D digital camera based on the time of flight is though also composed of two CMOS sensors, but one of them is to detect the gray-level value of an object and the other is to detect the depth information of the same object. The gray-level value and the depth information are integrated to synthesize the 3D stereoscopic image. Such technique comes up with the 2D and 3D information of the whole image, so that the viewpoint can be changeable and the synthesized 3D stereoscopic images are variable subject to different viewpoints. Although the individual 2D and 3D information can be processed synchronously, the two sensors detect the object at different positions, such that the binocular parallax needs to be complemented at the back end.

In the 3D camera, the CMOS sensor for sensing the object depth generally includes an Avalanche photodiode (APD), which is driven by close to its breakdown voltage with consideration of avoiding breakdown; the yield value can be deemed indefinite owing to a high current gain upon receipt of micro photons for detecting very weak light in a rapidly operating pixel circuit. As for the 2D camera, it focuses on dynamic range and resolution; the larger the dynamic range is, the more the maximum unsaturated signal can be detected and the larger the sensitivity range is in such a way that the captured color quality is closer to the ideal one.

So far, most of the patents in the prior art regarding the 3D image, sensor based on the time of flight for measuring the depth information improved the environment and method of measurement or the storage manners of image data. For example, U.S. Pat. No. 5,675,407 disclosed that the improvement was done by different wavelengths of colored lights under the time of flight. In other prior art, a phase meter was employed for detecting the depth information. The above prior art was usually based on the integration of the avalanche photodiode and the pixel circuit or improved the manufacturing process for rapid reaction. However, such prior art had a significant defective; namely, the 3D imaging can though come up with accurate depth information by a high-speed operation, but the dynamic range is not good. For example, in U.S. Pat. Nos. 7,547,872, 7,262,402 & 6,384,663, the avalanche photodiode is though integrated with the readout circuit for 3D imaging but no ideal dynamic range is available. Although some new approaches are proposed to improve such drawback, utilizing another high-dynamic 2-D image sensor for complementing the insufficiency of the 3D sensor, more extra costs are needed.

SUMMARY OF THE INVENTION

The primary objective of the present invention is to provide a 2D/3D dual-mode image sensing circuitry, which can be operated to obtain a high dynamic-range 2D gray-level value and to attain 3D depth information, which is switchable between the 2D and 3D modes.

The foregoing objective of the present invention is attained by the 2D/3D dual-mode image sensing circuitry composed of a photodiode, an active sensing unit, and a pull-down unit. The photodiode is to detect and convert optical signals into electronic signals. The active sensing unit is electrically connected with one end of the photodiode for receiving electronic signals outputted by the photodiode, having an output. The pull-down unit is electrically connected with the output, providing a pull-down path. The pull-down unit has a pull-down control terminal, by which the pull-down unit can be externally controllably switched on/off, for sinking the potential or not to the aforesaid end of the photodiode. In this way, as the 2D mode is switched on, the 3D mode is switched off; on the other hand, as the 3D mode is switched on, the 2D mode is switched off.

DETAILED DESCRIPTION OF PREFERRED EMBODIMENTS

Figure 1:
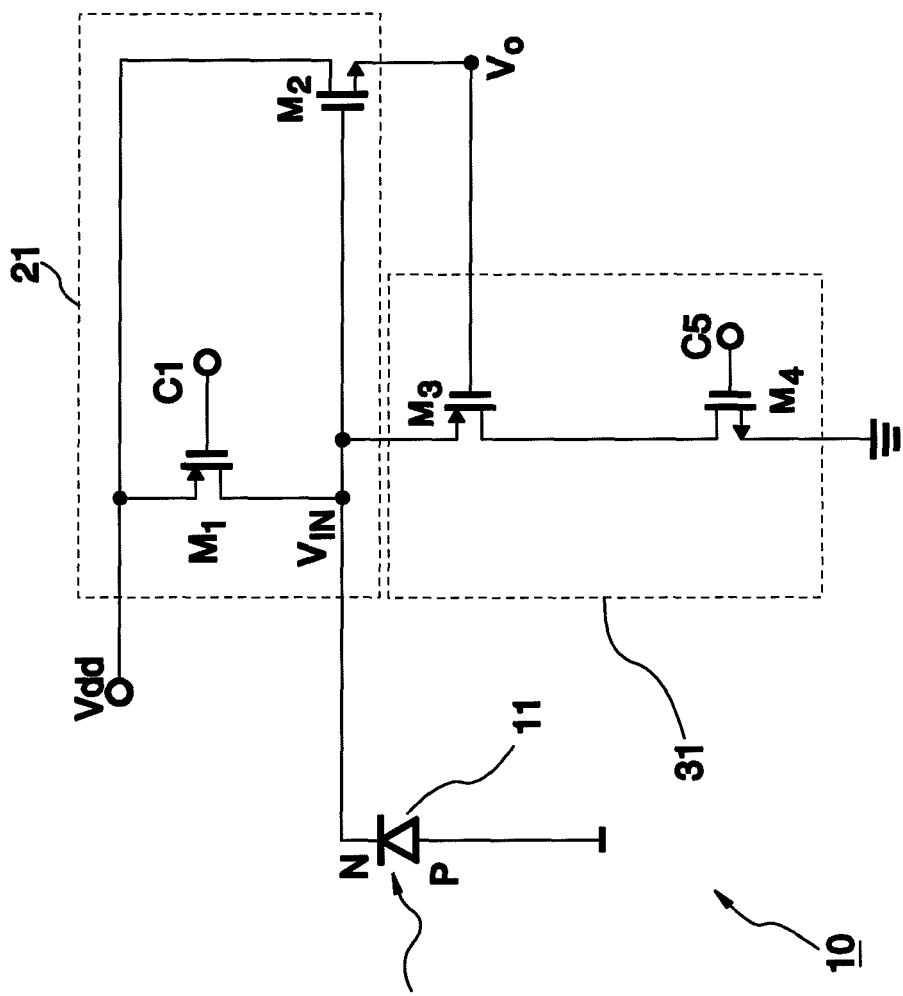
FIG. 1 is a circuit diagram of a first preferred embodiment of the present invention.

Referring to FIG. 1, a 2D/3D dual-mode image sensing circuitry 10 constructed according to a first preferred embodiment of the present invention is composed of a photodiode 11, an active sensing unit 21, and a pull-down unit 31. The detailed descriptions and operations of these elements as well as their interrelations are recited in the respective paragraphs as follows.

The photodiode 11 includes a P end and an N end for detecting and converting optical signals into electronic signals. The structure of the photodiode 11 is Pdiffusion_Nwell_Psubstrate and can alternatively be Ndiffusion_Pwell_Nsubstrate.

The active sensing unit 21 is electrically connected with one end of the photodiode 11 for receiving electronic signals outputted by the photodiode 11, having an output terminal Vo. The active sensing unit 21 is composed of a first transistor M1 and a second transistor M2. The first transistor M1 is electrically connected with a sensing control terminal C1. The active sensing unit 21 is controllably switched on/off by the sensing control terminal C1.

The pull-down unit 31 is electrically connected with the output terminal Vo and includes a pull-down control terminal C5. The pull-down unit 31 can be externally controllably switched on/off via the pull-down control terminal C5 for sinking the potential or not to the aforesaid end of the photodiode 11. In this embodiment, the pull-down unit 31 is composed of a third transistor M3 and a fourth transistor M4. The fourth transistor M4 is electrically connected with the pull-down control terminal C5 to be controllably switched on/off thereby.

The pull-down control terminal C5 controllably switches on/off the pull-down unit 31 in such a way that it is switchable between the 3D mode and the 2D mode.

In this embodiment, each of the transistors is a metal oxide silicon field-effect transistor (MOSFET). Among the transistors, each of the first and third transistors M1 and M3 is a P-channel MOSFET and each of the second and fourth transistors M2 and M4 is an N-channel MOSFET.

Figure 2:
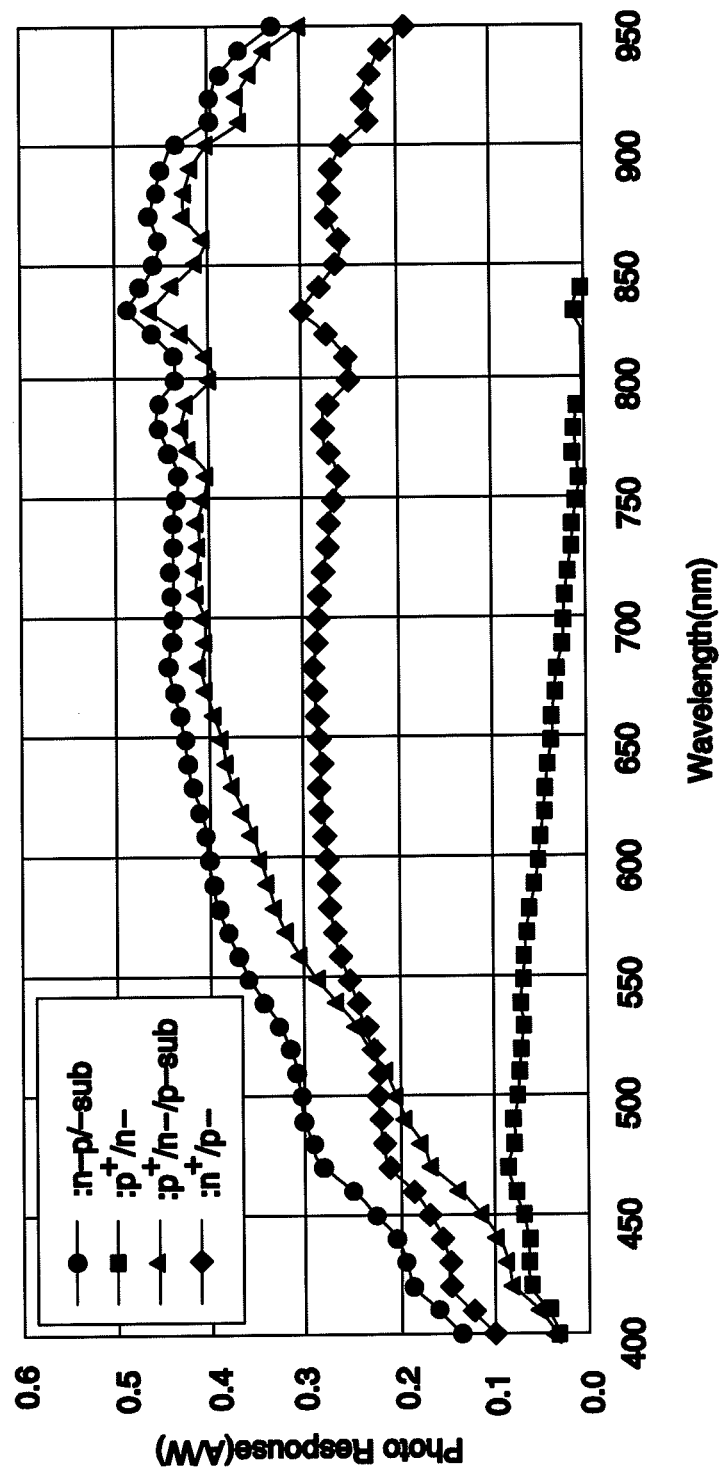
FIG. 2 is a diagram of photo responses of the photodiodes in accordance with the first preferred embodiment of the present invention.
Figure 3:
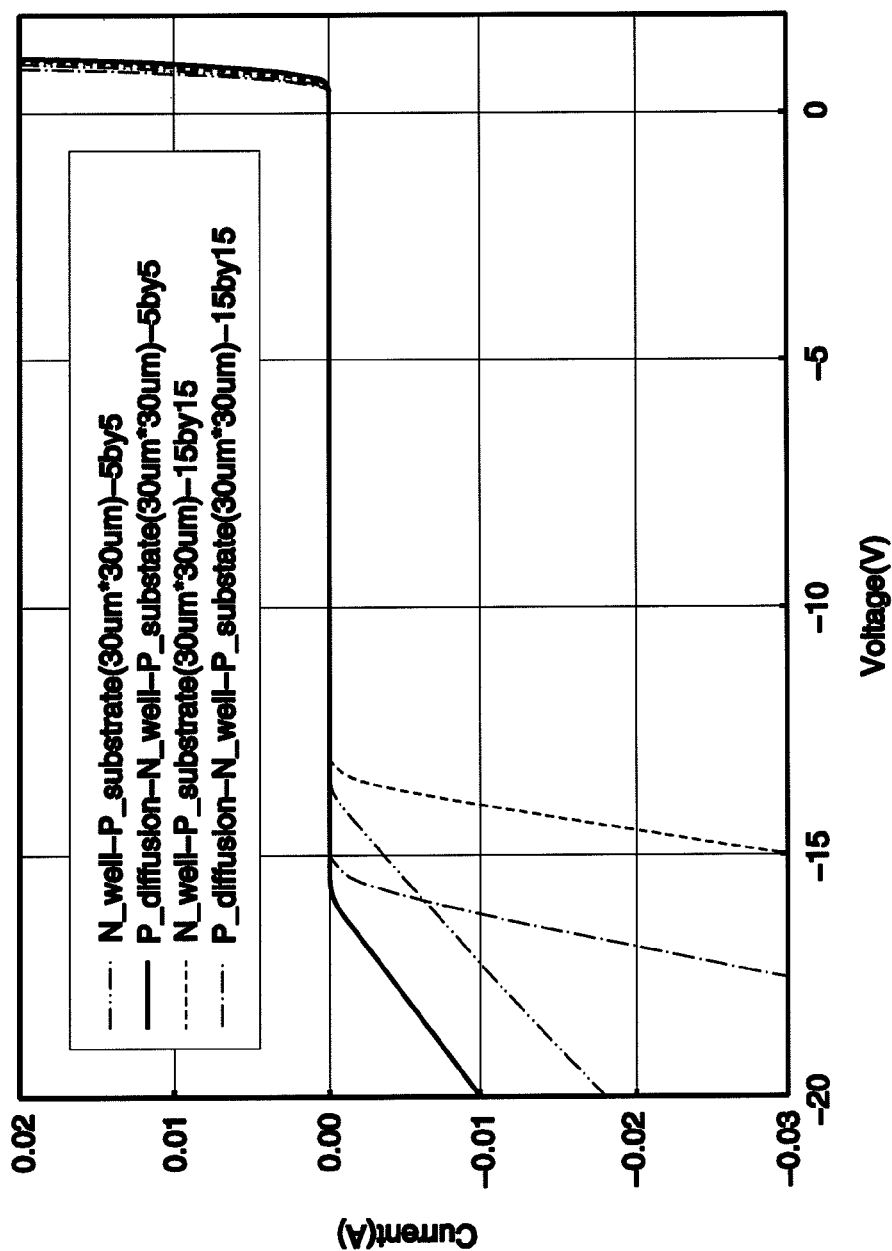
FIG. 3 is a diagram of breakdown voltages of the photodiodes in accordance with the first preferred embodiment of the present invention.

Referring to FIGS. 2-3, the photodiode of Nwell_Psubstrate has the best photo response. However, the photodiode of the present invention is provided with Pdiffusion_Nwell_Psubstrate because the P end need be provided by a high negative voltage under the 3D access mode and the photodiode of Nwell_Psubstrate may affect the other elements. Under the 3D mode, Psubstrate is not acted as the P end but Pdiffusion_Nwell is acted as the required diode. Under the 2D mode, each of Psubstrate and Pdiffusion is 0V, being a dual-photodiode mode, and the two-layer junction of the Nwell_Psubstrate is to complement the insufficiency of photo response of Pdiffusion_Nwell. The switchover of the voltage can allow the photodiode to be operated under the 2D and 3D modes, such that 2D and 3D sensors can be integrated and the photodiode of three-layer junction structure can be shared.

An external switching circuit (not shown) for switchover of the present invention between the 2D mode and the 3D mode can be connected to the P end of the photodiode 11. The switchover between grounding and negative voltage of the P end to switch the present invention between the 2D and 3D modes. Because the external switchover circuit belong to the prior art and it is not the crucial feature of the present invention, no more recitation is necessary.

While it is switched to the 2D mode, operate the pull-down control terminal C5 to switch off the pull-down unit 31 and operate the control terminal C1 to switch on the active sensing unit 21. In the meantime, the photodiode 11 is under the normal-biased mode. After the detected optical signals are converted into electronic signals, the electronic signals are processed by the active sensing unit 21 for output via the output terminal Vo.

While it is switched to the 3D mode, the pull-down control terminal C5 controllably switches on the pull-down unit 31 in due course, the photodiode 11 is driven by little smaller than its breakdown voltage, and the optical signals detected by the photodiode 11 are processed by the active sensing unit 21 to be converted into the electronic signals and then rapidly treated with voltage drop by the pull-down unit 31. Thus, the working requirement for the 3D mode can be satisfied and the photodiode 11 can be additionally protected by the voltage drop generated therefrom.

Figure 4:
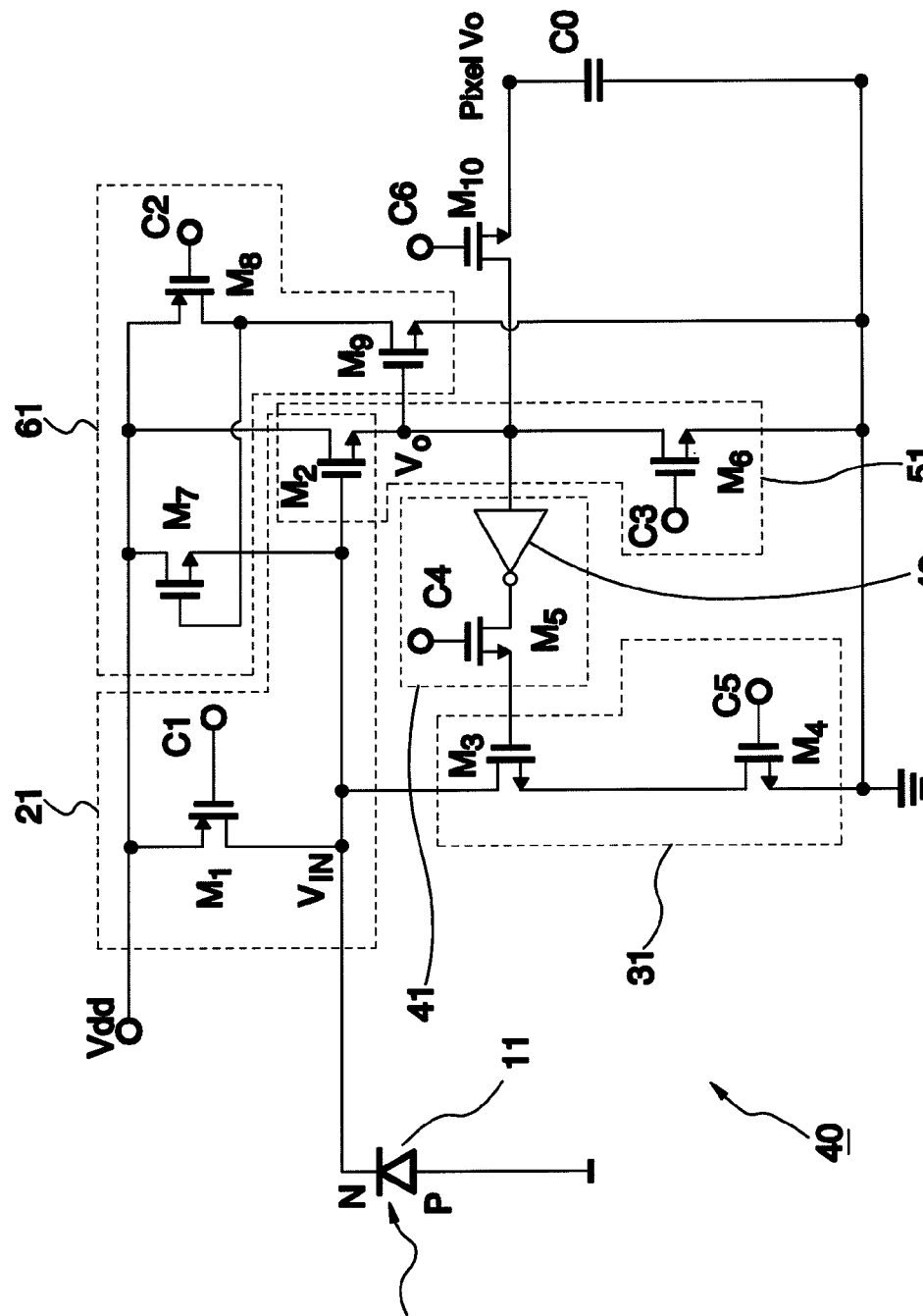
FIG. 4 is a circuit diagram of a second preferred embodiment of the present invention.

Referring to FIG. 4, a 2D/3D dual-mode image sensing circuitry 40 constructed according to a second preferred embodiment of the present invention is similar to that of the first embodiment, having the following difference. In addition to the photodiode 11, the active sensing unit 21, and the pull-down unit 31, the 2D/3D dual-mode image sensing circuitry 40 further includes a signal conversion unit 41, an amplification unit 51, a feedback unit 61, and a tenth transistor M10. The detailed descriptions and operations of these elements as well as their interrelations are recited in the respective paragraphs as follows.

The signal conversion unit 41 is electrically connected with the output terminal Vo and the third transistor M3 for converting and transmitting the signals outputted by the active sensing unit 21 to the pull-down unit 31. In the second embodiment, the signal conversion unit 41 is composed of a fifth transistor M5 and an inverter 42. The fifth transistor M5 is electrically connected with a conversion control terminal C4 to be controllably switched on/off thereby.

The amplification unit 51 is electrically connected with the output terminal Vo for amplifying the signals outputted by the active sensing unit 21. In the second embodiment, the amplification unit 51 is composed of a sixth transistor M6 and the second transistor M2. The sixth transistor M6 is electrically connected with an amplification control terminal C3 to be controllably switched on/off thereby.

The feedback unit 61 is electrically connected with the active sensing unit 21 and the output terminal Vo for applying the feedback to the active sensing unit 21. In the second embodiment, the feedback unit 61 is composed of a seventh transistor M7, an eighth transistor M8, and a ninth transistor M9. The eighth transistor M8 is electrically connected with a feedback control terminal C2 to be controllably switched on/off thereby.

The tenth transistor M10 is electrically connected with the output terminal Vo of the active sensing unit 21 and an output control terminal C6 and includes a pixel output Pixel Vo.

In the second embodiment, each of the transistors is an MOSFET. Among them, each of the first and eighth transistors is a P-channel MOSFET and each of second, third, fourth, fifth, sixth, seventh, ninth, and tenth transistors M2-M7 and M9-M10 is an N-channel MOSFET.

How the 2D/3D dual-mode image sensing circuitry 40 of the second embodiment is operated is recited in the following paragraphs.

When the present invention is switched to the 2D mode, it is operated under the normal reverse-biased mode; meanwhile, the P end of the photodiode 11 is switched to the grounding and the first transistor M1 is switched on. When $V_{IN}=V_{high}$, it is ready to detect photons and switch off the first transistor M1. If either of the photons is detected, photocurrents will be generated and $V_{IN}$ will become low due to conduction of the photocurrents. The seventh transistor M7 is a charge-supply transistor for applying charge supply to a parasitic capacitor of the photodiode 11 to prolong the time of saturation. The amplification unit 51 functions as first-stage signal amplification and the sixth transistor M6 functions as an active resistor. When $W_1$ lowers, the feedback unit 61 detects the voltage of the output terminal Vo and yields the feedback of activation signals in due course to switch on the seventh transistor M7, thus improving the drawback that the voltage at $V_{IN}$ is subject to loss and its linearity is subject to reduction.

Figure 5:
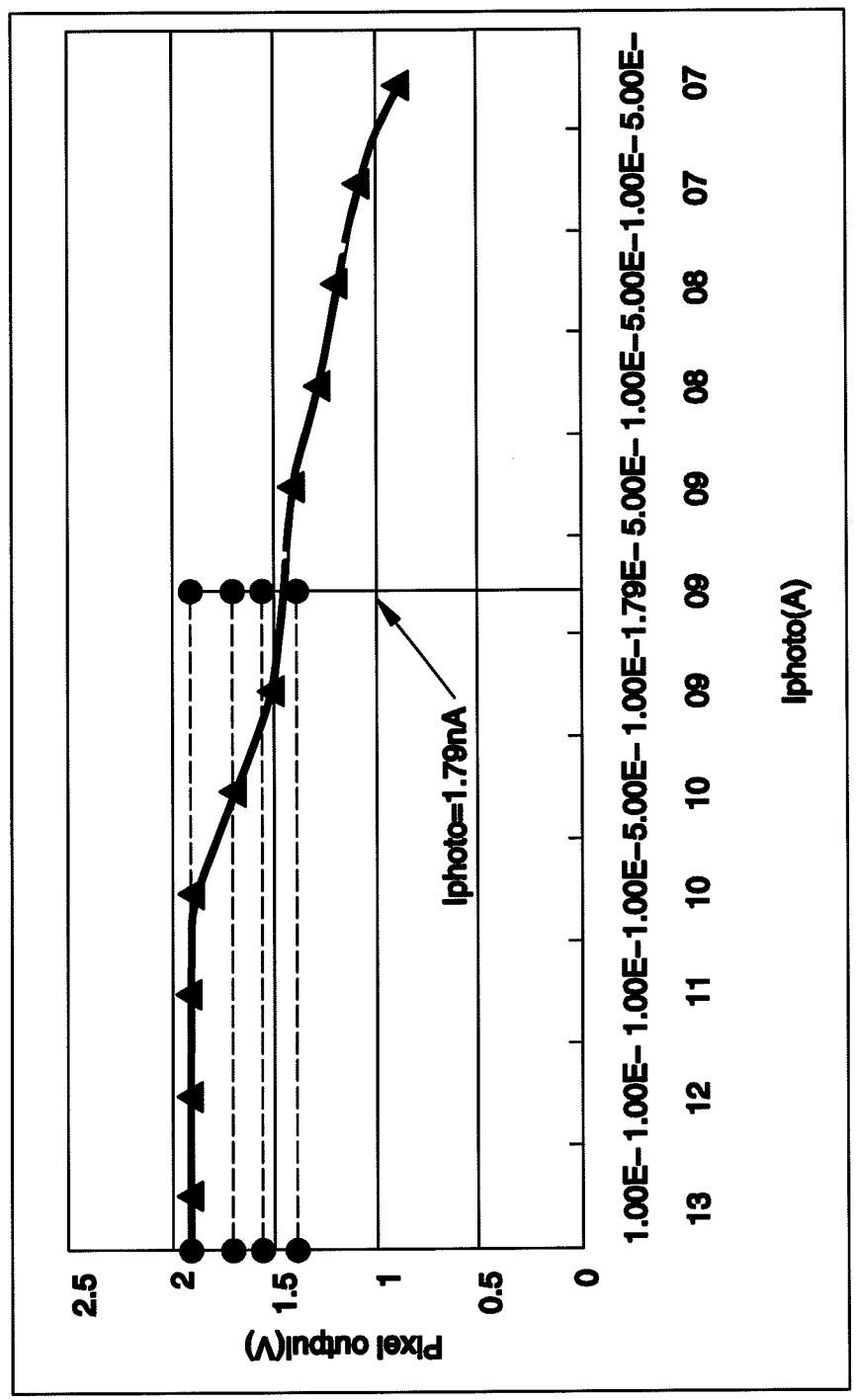
FIG. 5 is a diagram of pixel output in accordance with the second preferred embodiment of the present invention, illustrating the outcome of simulations under the 2D mode.

FIG. 5 illustrates the outcome of simulations under the 2D mode, indicating that the dynamic range can reach 134 dB.

Figure 6:
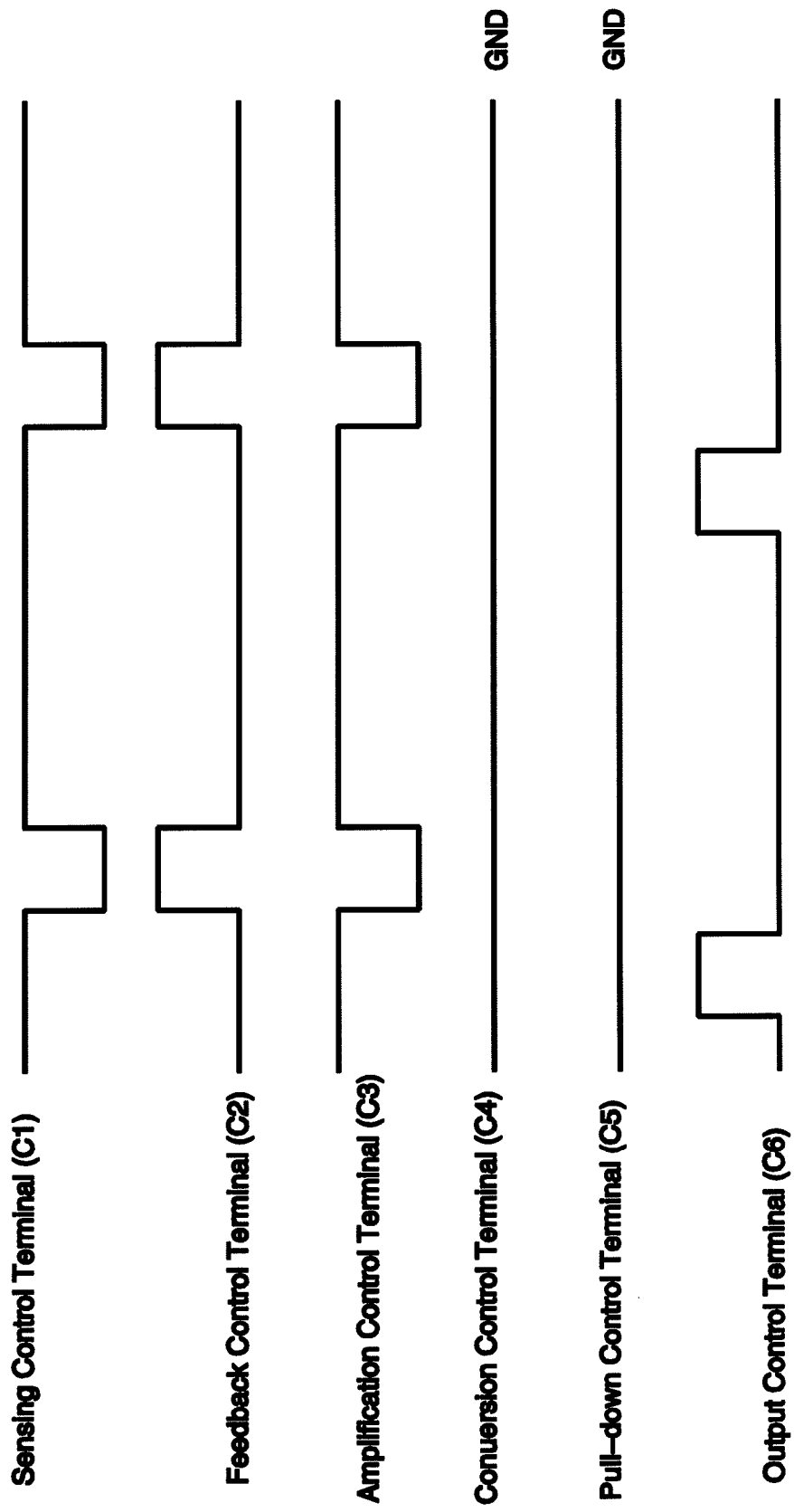
FIG. 6 is a timing diagram of operations under the 2D mode in accordance with the second preferred embodiment of the present invention.

FIG. 6 is a timing diagram under the 2D mode, showing that the feedback control terminal C2 and the amplification control terminal C3 switch off the eighth transistor M8 and the sixth transistor M6, respectively, while the sensing control terminal C1 is low-potential and the potential of $V_{IN}$ is raised. Besides, the conversion control terminal C4 and the pull-down control terminal C5 switch off the fifth transistor M5 and the fourth transistor M4, respectively. Next, when the photodiode 11 detects the light, the sensing control terminal C1 switches off the first transistor M1, and the feedback control terminal C2 and the amplification control terminal C3 switch on the eighth transistor M8 and the sixth transistor M6, respectively, to actively detect and balance the potential at $V_{IN}$. Finally, the output control terminal C6 switches on the tenth transistor M10 to send out the gray-level information that an analogous voltage stands for.

Figure 7:
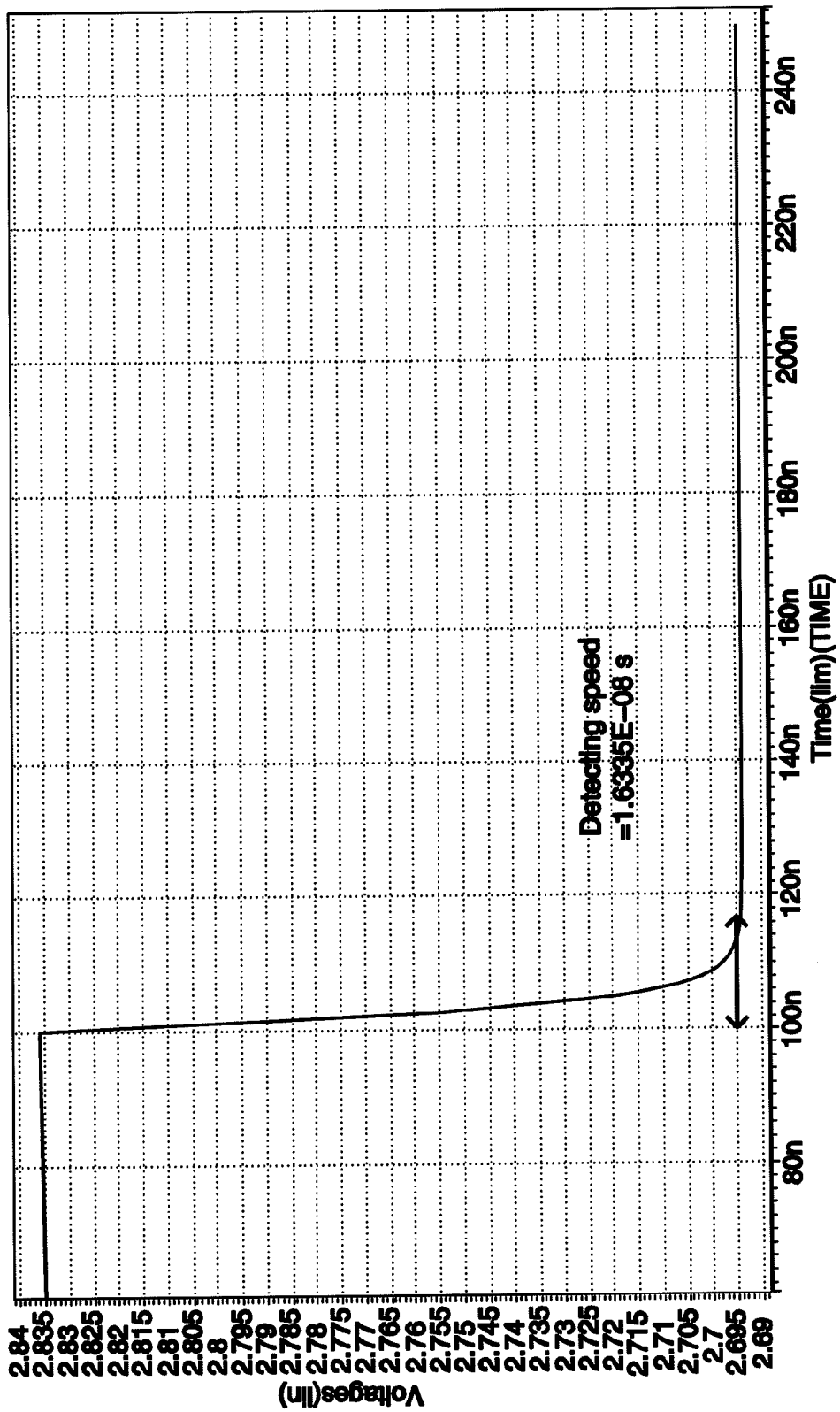
FIG. 7 is a diagram of detecting speed in accordance with the second preferred embodiment of the present invention, illustrating the outcome of detection under the 3D mode.

When the present invention is switched to the 3D mode, the P end of the photodiode 11 is connected to a negative voltage $-V_{low}$, the first transistor M1 is switched on to fully charge $V_{IN}$. When $V_{IN}=V_{high}$, it is ready to detect photons and switch off the first transistor M1. If a few of the photons are detected, the photodiode 11 will generate a lot of photocurrents due to the avalanche effect, and meanwhile, the fifth transistor M5 and the fourth transistor M4 are switched on and the third transistor M3 is switched on via the inverter 42 to immediately suppress $V_{IN}$ downward. Under such mode, the seventh transistor M7 is acted as a ballast. When the suppression of $V_{IN}$ ends, $V_{IN}$ is low-voltage, the fifth and fourth transistors M5 and M4 are switched off, and the first transistor M1 keeps being switched on until $V_{IN}=V_{high}$. Such operation can puzzle out the problems of failing to predict the dead time of discharging and the afterpulsing. FIG. 7 shows the outcome of simulations under the 3D mode, indicating that the detecting speed is 1.6335E-08s.

Figure 8:
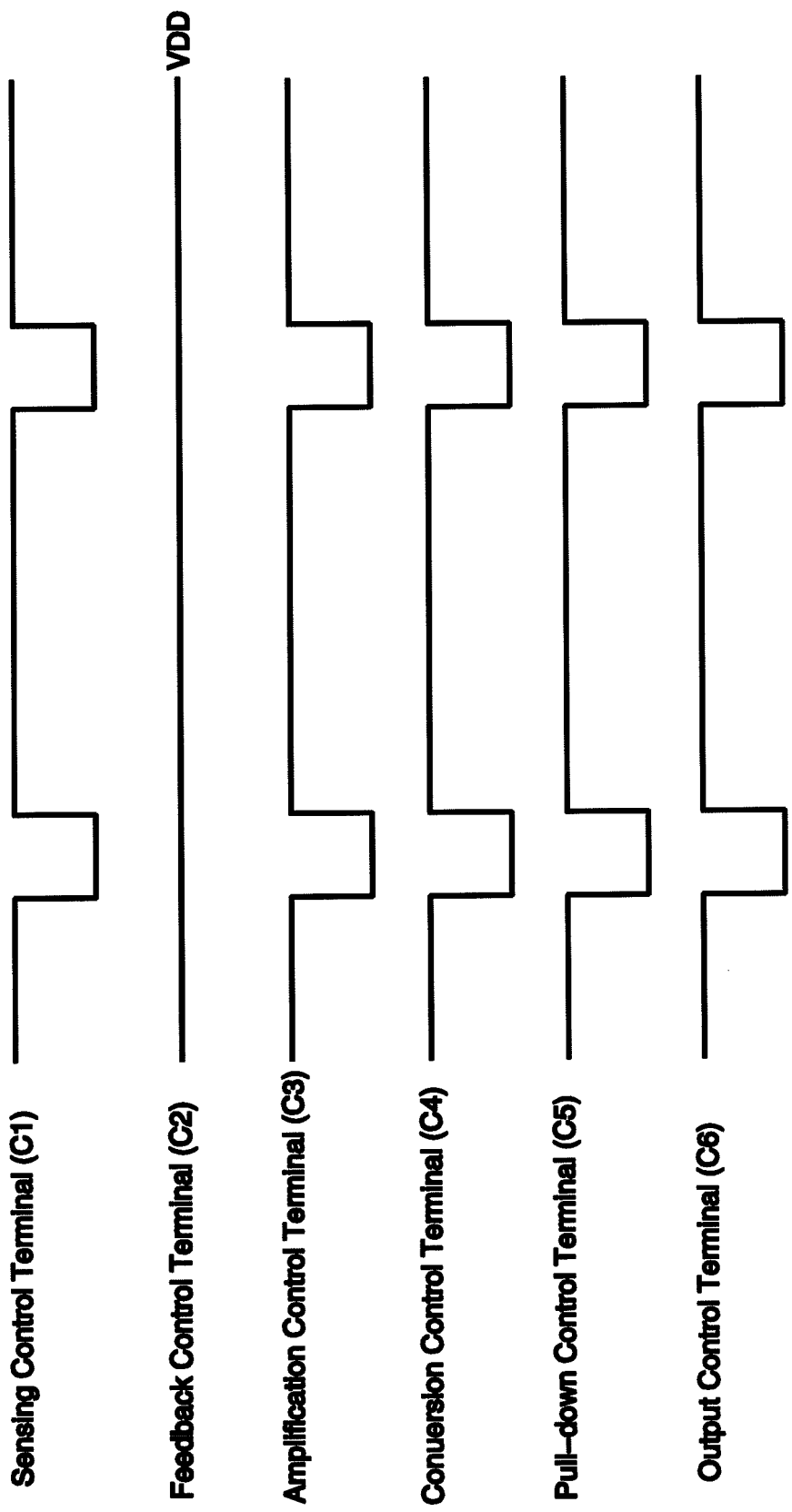
FIG. 8 is a timing diagram of operations under the 3D mode in accordance with the second preferred embodiment of the present invention.

FIG. 8 shows a timing diagram under the 3D mode, illustrating that the amplification control terminal C3, the conversion control terminal C4, and the pull-down control terminal C5 switch off the sixth, fifth, and fourth transistors M6, M5 & M4, respectively, when the sensing control terminal C1 is low-potential and $V_{IN}$ is raised. Especially, when the 3D image sensing proceeds, the feedback control terminal C2 eternally switches off the eighth transistor M8. Next, when the photodiode 11 detects the light, the sensing control terminal C1 switches off the first transistor M1 and the amplification control terminal C3, the conversion control terminal C4, and the pull-down control terminal C5 switches on the sixth transistor M6, the fifth transistor M5, and the fourth transistor M4, respectively, to actively and acceleratively detect the variation of the potential at V. Besides, the output control terminal C6 also switches on the tenth transistor M10 to send out the pulse information indicative of the analogous voltage variation for a post-processing (not shown) unit to compute 3D information of a pixel.

When the photodiode 11 is driven by smaller than its breakdown voltage, it is a general photosensitive diode and it is intended to acquire a gray-level value, such that it is applicable to the 2D mode and it functions as enhancing its dynamic range, sensitivity, and linearity. On the other hand, when the photodiode 11 is driven by close to its breakdown voltage, it functions at the Geiger mode to work for 3D depth sensing to accelerate its signal access time. Thus, the circuit diagrams shown in FIGS. 1 and 4 conform to the above requirements for switchover between the 2D and 3D modes.

Because the circuitry of the present invention integrates the 2D and 3D modes, when the 2D mode proceeds, to prevent a discharging path from formation resulting from the third transistor M3 controlled by the signal conversion unit 41 and the fifth transistor M5, it is necessary to switch off the fifth transistor M5.

The circuitry illustrated in the present invention is a single-sensor image sensing circuit, However, the actual product of the present invention is an N×N pixel matrix, in which each pixel in the same row needs an output control to prevent its signal from interference with one another, such that the tenth transistor M10 is provided in the second embodiment for controlling whether the pixel output Pixel Vo should be activated.

In addition, when the 3D mode proceeds, the feedback unit 61 which is only available under the 2D mode though stops feedback because the eighth transistor M8 is switched off, but the idle feedback unit 61 does not affect the instantaneous response time. Thus, the circuitry under the 2D mode and the circuitry under the 3D mode can be effectively integrated as the primary feature of the present invention.

In conclusion, the present invention is to integrate the 2D and 3D modes into one circuitry, such that one single image sensor can be employed and switchable between the 2D and 3D modes. Under the 2D mode, it works for the readout within a high dynamic range. Under the 3D mode, it works for rapid access to obtain the depth information of each pixel.

Although the present invention has been described with respect to specific preferred embodiments thereof, it is in no way limited to the specifics of the illustrated structures but changes and modifications may be made within the scope of the appended claims.

What is claimed is:

1. A 2D/3D dual-mode image sensing circuitry comprising:
 a photodiode for detecting and converting an optical signal into an electronic signal;
 an active sensing unit having an output terminal and electrically connected with an end of the photodiode for receiving the electronic signal outputted by the photodiode; and
 a pull-down unit electrically connected with the output terminal of the active sensing unit and having a pull-down control terminal, by which the pull-down unit is externally controllably switched on/off for sinking the potential or not to said end of the photodiode that the active sensing unit is electrically connected with;
 whereby switching on/off the pull-down unit via the pull-down control terminal, makes the 3D and 2D modes switchable therebetween.

2. The 2D/3D dual-mode image sensing circuitry as defined in claim 1, wherein the active sensing unit is composed of a first transistor and a second transistor, the first transistor being electrically connected with a sensing control terminal, whereby the active sensing unit is controllably switched on/off by the sensing control terminal.

3. The 2D/3D dual-mode image sensing circuitry as defined in claim 1, wherein the pull-down unit is composed of a third transistor and a fourth transistor, the fourth transistor being electrically connected with the pull-down control terminal to be controllably switched on/off thereby.

4. The 2D/3D dual-mode image sensing circuitry as defined in claim 1 further comprising a signal conversion unit, wherein the signal conversion unit is electrically connected with the output terminal of the active sensing unit and the pull-down unit for converting and transmitting the signal outputted from the active sensing unit to the pull-down unit.

5. The 2D/3D dual-mode image sensing circuitry as defined in claim 4, wherein the signal conversion unit is composed of a fifth transistor and an inverter, the fifth transistor being electrically connected with a conversion control terminal to be controllably switched on/off thereby.

6. The 2D/3D dual-mode image sensing circuitry as defined in claim 1 further comprising an amplification unit, wherein the amplification unit is electrically connected with the output terminal of the active sensing unit for amplifying the signal outputted from the active sensing unit.

7. The 2D/3D dual-mode image sensing circuitry as defined in claim 6, wherein the amplification unit is composed of a sixth transistor and the second transistor, the sixth transistor being electrically connected with an amplification terminal to be controllably switched on/off thereby.

8. The 2D/3D dual-mode image sensing circuitry as defined in claim 1 further comprising a feedback unit, wherein the feedback unit is electrically connected with the active sensing unit and the output terminal for applying feedback to the active sensing unit.

9. The 2D/3D dual-mode image sensing circuitry as defined in claim 8, wherein the feedback unit is composed of a seventh transistor, an eighth transistor, and a ninth transistor, the eighth transistor being electrically connected with a feedback control terminal to be controllably switched on/off thereby.

10. The 2D/3D dual-mode image sensing circuitry as defined in claim 1 further comprising a tenth transistor, wherein the tenth transistor is electrically connected with the output terminal of the active sensing unit and an output control terminal and includes a pixel output.

11. The 2D/3D dual-mode image sensing circuitry as defined in claim 1, wherein the photodiode is provided with Pdiffusion_Nwell_Psubstrate or Ndiffusion_Pwell_Nsubstrate as its junction structure.

* * * * *